(12) United States Patent
Cheng

(10) Patent No.: US 10,764,850 B2
(45) Date of Patent: Sep. 1, 2020

(54) INFORMATION TRANSCEIVING METHOD, APPARATUS, AND SYSTEM

(71) Applicant: HUAWEI TECHNOLOGIES CO., LTD., Shenzhen, Guangdong (CN)

(72) Inventor: Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 16/186,403

(22) Filed: Nov. 9, 2018

(65) Prior Publication Data

US 2019/0082404 A1    Mar. 14, 2019

Related U.S. Application Data

(63) Continuation of application No. PCT/CN2017/083615, filed on May 9, 2017.

(30) Foreign Application Priority Data

May 12, 2016    (CN) .......................... 2016 1 0316999

(51) Int. Cl.
*H04W 56/00*    (2009.01)
*H04L 27/26*    (2006.01)
(Continued)

(52) U.S. Cl.
CPC .......... *H04W 56/001* (2013.01); *H04L 27/26* (2013.01); *H04L 27/2611* (2013.01);
(Continued)

(58) Field of Classification Search
CPC .......... H04W 56/001; H04W 72/0446; H04W 88/02; H04W 88/08; H04W 36/0083;
(Continued)

(56) References Cited

U.S. PATENT DOCUMENTS

2005/0099968 A1    5/2005  Yamano
2011/0206019 A1    8/2011  Zhai et al.
(Continued)

FOREIGN PATENT DOCUMENTS

| CN | 105144731 A | 12/2015 |
|---|---|---|
| CN | 105264995 A | 1/2016 |
| CN | 105519064 A | 4/2016 |

OTHER PUBLICATIONS

Juho Lee et al.,"LTE-advanced in 3GPP Rel-13/14: an evolution toward 5G", IEEE Communications Magazine ( vol. 54 , Issue: 3 , Mar. 2016 ),total 7 pages.
(Continued)

*Primary Examiner* — Vinncelas Louis
(74) *Attorney, Agent, or Firm* — Fish & Richardson P.C.

(57) ABSTRACT

An information transceiving method, apparatus, and system are described. The information transceiving method includes: determining a subframe length of a serving cell; determining a synchronization signal period of the serving cell based on the subframe length of the serving cell; and sending or receiving information in the serving cell based on the synchronization signal period and the subframe length. In some implementations, the synchronization signal period of the serving cell is determined based on the subframe length of the serving cell.

17 Claims, 4 Drawing Sheets

---

User equipment determines a subframe length of a serving cell — 401

The user equipment determines a synchronization signal period of the serving cell based on the subframe length of the serving cell — 402

The user equipment receives system information of the serving cell — 403

The user equipment sends or receives information in the serving cell based on the synchronization signal period and the subframe length — 404

(51) Int. Cl.
    *H04W 72/04* (2009.01)
    *H04L 5/00* (2006.01)
    *H04W 88/02* (2009.01)
    *H04W 88/08* (2009.01)
(52) U.S. Cl.
    CPC ...... *H04L 27/2666* (2013.01); *H04L 27/2692* (2013.01); *H04W 72/0446* (2013.01); *H04L 5/0091* (2013.01); *H04W 88/02* (2013.01); *H04W 88/08* (2013.01)
(58) Field of Classification Search
    CPC .... H04W 16/14; H04L 27/26; H04L 27/2692; H04L 27/2611; H04L 27/2666; H04L 5/0091; H04L 27/2655
    See application file for complete search history.

(56) References Cited

U.S. PATENT DOCUMENTS

| | | |
|---|---|---|
| 2011/0261749 A1 | 10/2011 | Youn et al. |
| 2012/0213508 A1 | 8/2012 | Moynihan et al. |
| 2013/0210439 A1* | 8/2013 | Bae .................. H04W 36/0083 455/436 |
| 2016/0029179 A1 | 1/2016 | Kim et al. |
| 2016/0366672 A1 | 12/2016 | Papasakellariou et al. |
| 2017/0006626 A1* | 1/2017 | Lin ....................... H04W 16/14 |
| 2017/0156121 A1 | 6/2017 | Tian et al. |

OTHER PUBLICATIONS

International Search Report and Written Opinion issued in International Application No. PCT/CN2017/083612 dated Jul. 28, 2017, 21 pages.
Ntt Docomo et al: "PUSCH design for shortened TTI", 3GPP Draft; R1-163173, No. Busan, Korea; 20160411-20160415, Apr. 1, 2016, XP051079878, 6 pages.
Ericsson:"Physical layer aspects of short TTI for downlink transmissions", 3GPP Draft; [LATRED] R1-160934, vol. RAN WG1, No. Malta; 20160215-20160219, Feb. 6, 2016, XP051064063, 4 pages.
Extended European Search Report issued in European Application No. 17795526.7 dated Apr. 4, 2019, 8 pages.
Office Action issued in Chinese Application No. 201610316999.X dated Sep. 20, 2019, 5 pages.
Search Report issued in Chinese Application No. 201610316999.X dated Sep. 10, 2019, 4 pages (with English translation).
Ntt Docomo Inc., "DL aspects of TTI shortening", 3GPP TSG-RAN WG1 Meeting #84, R1-160964, Feb. 5, 2016, 7 pages.
Nokia, Alcatel-Lucent Shanghai Bell, "Flexible numerology for 5G New Radio", 3GPP TSG-RAN WG1 Meeting #84B, R1-162894, Apr. 1, 2016, 5 pages.
Office Action issued in Japanese Application No. 2018559374 dated Oct. 1, 2019, 9 pages (With English Translation).

* cited by examiner

INFORMATION TRANSCEIVING METHOD, APPARATUS, AND SYSTEM

CROSS-REFERENCE TO RELATED APPLICATIONS

This application is a continuation of International Application No. PCT/CN2017/083615, filed on May 9, 2017, which claims priority to Chinese Patent Application No. 201610316999.X, filed on May 12, 2016. The disclosures of the aforementioned applications are hereby incorporated by reference in their entireties.

TECHNICAL FIELD

The embodiments of the present invention relates to the network application field, and in particular, to an information transceiving method, apparatus, and system.

BACKGROUND

A 5G network, namely, a new radio (NR) network, aims to support higher system performance, including support of different services, different deployment scenarios, and different spectrums. Different services include an enhanced mobile broadband (eMBB) service, a machine type communication (MTC) service, an ultra-reliable and low latency communications (URLLC) service, a Multimedia Broadcast Multicast Service (MBMS), a positioning service, and the like. Different deployment scenarios include an indoor hotspot scenario, a dense urban scenario, a suburban scenario, an urban macro coverage scenario, a high-speed railway scenario, and the like. 5G supports a spectrum range up to 100 gigahertz (GHz), a primary frequency band is lower than or equal to 6 GHz, and a secondary frequency band is higher than 6 GHz.

Different services, different deployment scenarios, and different spectrum have different features, and their respective requirements for system parameters (also referred to as numerology) are different. To support, with high performance, different services, different deployment scenarios, and different spectrum, 5G supports a plurality of sets of system parameters. For example, 5G supports different subcarrier spacings, the different subcarrier spacings are corresponding to different system parameters, and a same subcarrier spacing may support different subframe lengths. Currently, the subframe length may also be referred to as a transmission time interval (TTI) length, or the subframe length may also be referred to as a transmission time unit (TTU) length. A relatively small subframe length such as a subframe length less than 1 millisecond (ms) may be used for a low latency service, for example, URLLC. A relatively large subframe length such as a subframe length of 1 ms may be used for a service whose latency requirement is not high, a service whose data packet size is relatively large, or the like, for example, eMBB.

How to design synchronization signals corresponding to different subframe lengths in a 5G communications network is a problem that needs to be resolved urgently.

SUMMARY

To resolve a problem about how to configure synchronization signals corresponding to different subframe lengths in a 5G communications network, embodiments of the present invention provide an information transceiving method, apparatus, and system. Technical solutions are as follows:

According to a first aspect, an information transceiving method is provided, where the method includes: determining, by user equipment, a subframe length of a serving cell; determining, by the user equipment, a synchronization signal period of the serving cell based on the subframe length of the serving cell; and sending or receiving, by the user equipment, information in the serving cell based on the synchronization signal period and the subframe length. The synchronization signal period of the serving cell is determined based on the subframe length of the serving cell, so that a design problem of synchronization signals corresponding to different subframe lengths in a 5G communications network is resolved.

In a possible design, the determining, by the user equipment, a synchronization signal period of the serving cell based on the subframe length of the serving cell includes: determining, by the user equipment based on the subframe length of the serving cell, a subframe length set corresponding to the subframe length of the serving cell; and determining, by the user equipment, the synchronization signal period of the serving cell based on a maximum subframe length in the subframe length set. Because the synchronization signal period of the serving cell is determined by using the maximum subframe length in the subframe length set corresponding to the subframe length of the serving cell, different subframe lengths belonging to a same subframe length set are corresponding to only one synchronization signal design, and design complexity is reduced. In addition, synchronization signal overheads may be reduced and resource utilization may be improved while a proper latency is ensured.

In a possible design, the determining, by the user equipment, a synchronization signal period of the serving cell based on the subframe length of the serving cell includes: determining, by the user equipment based on the subframe length of the serving cell, a subframe length set corresponding to the subframe length of the serving cell; and determining, by the user equipment, the synchronization signal period of the serving cell based on a minimum subframe length in the subframe length set. Because the synchronization signal period of the serving cell is determined by using the minimum subframe length in the subframe length set corresponding to the subframe length of the serving cell, different subframe lengths belonging to a same subframe length set are corresponding to only one synchronization signal design, and design complexity is reduced. In addition, a cell access time of the user equipment and a service latency may be reduced while proper overheads are ensured.

In a possible design, the subframe length set corresponding to the subframe length of the serving cell is one of a first subframe length set and a second subframe length set, and any subframe length in the first subframe length set is greater than any subframe length in the second subframe length set.

In a possible design, a synchronization signal period that is of the serving cell and is determined based on the first subframe length set is longer than a synchronization signal period that is of the serving cell and is determined based on the second subframe length set.

In a possible design, the first subframe length set includes a first subframe length and a second subframe length, the first subframe length is equal to 0.5 millisecond, the second subframe length is equal to 1 millisecond, the second subframe length set includes a third subframe length and a fourth subframe length, the third subframe length is equal to 0.125 millisecond, and the fourth subframe length is equal to 0.25 millisecond. Different subframe lengths corresponding to a same subcarrier spacing are grouped into two subframe length sets, two shortest subframe lengths belong to a same subframe length set, and two longest subframe lengths belong to a same subframe length set. Therefore, when a same synchronization signal design is used for a same subframe length set, proper resources can be used to ensure a proper latency requirement.

In a possible design, the subframe length set corresponding to the subframe length of the serving cell includes a first subframe length and a second subframe length, the first subframe length is equal to 0.5 millisecond, and the second subframe length is equal to 1 millisecond; or the subframe length set corresponding to the subframe length of the serving cell includes a third subframe length and a fourth subframe length, the third subframe length is equal to 0.125 millisecond, and the fourth subframe length is equal to 0.25 millisecond.

In a possible design, the determining, by the user equipment, a synchronization signal period of the serving cell based on the subframe length of the serving cell includes: if the subframe length of the serving cell is equal to 0.125 millisecond, determining, by the user equipment, the synchronization signal period of the serving cell based on a subframe length of 0.25 millisecond; if the subframe length of the serving cell is equal to 0.25 millisecond, determining, by the user equipment, the synchronization signal period of the serving cell based on a subframe length of 0.25 millisecond; if the subframe length of the serving cell is equal to 0.5 millisecond, determining, by the user equipment, the synchronization signal period of the serving cell based on a subframe length of 1 millisecond; or if the subframe length of the serving cell is equal to 1 millisecond, determining, by the user equipment, the synchronization signal period of the serving cell based on a subframe length of 1 millisecond.

In a possible design, the determining, by the user equipment, a synchronization signal period of the serving cell based on the subframe length of the serving cell includes: if the subframe length of the serving cell is equal to 0.125 millisecond, determining, by the user equipment, that the synchronization signal period of the serving cell is a positive integer multiple of 0.25 millisecond; if the subframe length of the serving cell is equal to 0.25 millisecond, determining, by the user equipment, that the synchronization signal period of the serving cell is a positive integer multiple of 0.25 millisecond; if the subframe length of the serving cell is equal to 0.5 millisecond, determining, by the user equipment, that the synchronization signal period of the serving cell is a positive integer multiple of 1 millisecond; or if the subframe length of the serving cell is equal to 1 millisecond, determining, by the user equipment, that the synchronization signal period of the serving cell is a positive integer multiple of 1 millisecond.

In a possible design, the determining, by the user equipment, a synchronization signal period of the serving cell based on the subframe length of the serving cell includes: if the subframe length of the serving cell is equal to 0.125 millisecond, determining, by the user equipment, that the synchronization signal period of the serving cell is 1.25 milliseconds; if the subframe length of the serving cell is equal to 0.25 millisecond, determining, by the user equipment, that the synchronization signal period of the serving cell is 1.25 milliseconds; if the subframe length of the serving cell is equal to 0.5 millisecond, determining, by the user equipment, that the synchronization signal period of the serving cell is 5 milliseconds; or if the subframe length of the serving cell is equal to 1 millisecond, determining, by the user equipment, that the synchronization signal period of the serving cell is 5 milliseconds.

In a possible design, the method further includes: receiving, by the user equipment, system information of the serving cell, where a system information period of the serving cell is the same as the synchronization signal period of the serving cell.

In a possible design, the method further includes: determining, by the user equipment, a system information period of the serving cell based on the subframe length of the serving cell; and the sending or receiving, by the user equipment, information in the serving cell based on the synchronization signal period and the subframe length further includes: sending or receiving, by the user equipment, information in the serving cell based on the synchronization signal period, the system information period of the serving cell, and the subframe length.

In a possible design, the determining, by the user equipment, a system information period of the serving cell based on the subframe length of the serving cell includes: determining, by the user equipment based on the subframe length of the serving cell, a subframe length set corresponding to the subframe length of the serving cell; and determining, by the user equipment, the system information period of the serving cell based on a maximum subframe length in the subframe length set.

In a possible design, the determining, by user equipment, a subframe length of a serving cell includes: determining, by the user equipment, a sequence corresponding to a synchronization signal of the serving cell; and determining, by the user equipment, the subframe length of the serving cell based on the sequence corresponding to the synchronization signal.

In a possible design, the determining, by the user equipment, the subframe length of the serving cell based on the sequence corresponding to the synchronization signal includes: if the sequence corresponding to the synchronization signal is a first sequence, determining, by the user equipment, that the subframe length of the serving cell is a first subframe length; or if the sequence corresponding to the synchronization signal is a second sequence, determining, by the user equipment, that the subframe length of the serving cell is a second subframe length.

In a possible design, the determining, by the user equipment, the subframe length of the serving cell based on the sequence corresponding to the synchronization signal includes: if the sequence corresponding to the synchronization signal is a third sequence, determining, by the user equipment, that the subframe length of the serving cell is a third subframe length; or if the sequence corresponding to the synchronization signal is a fourth sequence, determining, by the user equipment, that the subframe length of the serving cell is a fourth subframe length.

In a possible design, the first subframe length is 0.125 millisecond, and the second subframe length is 0.25 millisecond.

In a possible design, the third subframe length is 0.5 millisecond, and the fourth subframe length is 1 millisecond.

In a possible design, the synchronization signal is a primary synchronization signal.

In a possible design, the synchronization signal is located in the first N symbols of a subframe that carries the synchronization signal, and N is greater than or equal to 1.

According to a second aspect, an information transceiving method is provided, where the method includes: determining, by a base station, a subframe length of a serving cell; determining, by the base station, a synchronization signal period of the serving cell based on the subframe length of the serving cell; sending, by the base station, a synchronization signal in the serving cell based on the synchronization signal period; and sending or receiving, by the base station, information in the serving cell based on the subframe length of the serving cell.

In a possible design, the determining, by the base station, a synchronization signal period of the serving cell based on the subframe length of the serving cell includes: determining, by the base station based on the subframe length of the serving cell, a subframe length set corresponding to the subframe length of the serving cell; and determining, by the base station, the synchronization signal period of the serving cell based on a maximum subframe length in the subframe length set.

In a possible design, the determining, by the base station, a synchronization signal period of the serving cell based on the subframe length of the serving cell includes: determining, by the base station based on the subframe length of the serving cell, a subframe length set corresponding to the subframe length of the serving cell; and determining, by the base station, the synchronization signal period of the serving cell based on a minimum subframe length in the subframe length set. Because the synchronization signal period of the serving cell is determined by using the minimum subframe length in the subframe length set corresponding to the subframe length of the serving cell, different subframe lengths belonging to a same subframe length set are corresponding to only one synchronization signal design, and design complexity is reduced. In addition, a cell access time of user equipment and a service latency may be reduced while proper overheads are ensured.

In a possible design, the subframe length set corresponding to the subframe length of the serving cell is one of a first subframe length set and a second subframe length set, and any subframe length in the first subframe length set is greater than any subframe length in the second subframe length set.

In a possible design, a synchronization signal period that is of the serving cell and is determined based on the first subframe length set is longer than a synchronization signal period that is of the serving cell and is determined based on the second subframe length set.

In a possible design, the first subframe length set includes a first subframe length and a second subframe length, the first subframe length is equal to 0.5 millisecond, the second subframe length is equal to 1 millisecond, the second subframe length set includes a third subframe length and a fourth subframe length, the third subframe length is equal to 0.125 millisecond, and the fourth subframe length is equal to 0.25 millisecond.

In a possible design, the subframe length set corresponding to the subframe length of the serving cell includes a first subframe length and a second subframe length, the first subframe length is equal to 0.5 millisecond, and the second subframe length is equal to 1 millisecond; or the subframe length set corresponding to the subframe length of the serving cell includes a third subframe length and a fourth subframe length, the third subframe length is equal to 0.125 millisecond, and the fourth subframe length is equal to 0.25 millisecond.

In a possible design, the determining, by the base station, a synchronization signal period of the serving cell based on the subframe length of the serving cell includes: if the subframe length of the serving cell is equal to 0.125 millisecond, determining, by the base station, the synchronization signal period of the serving cell based on a subframe length of 0.25 millisecond; if the subframe length of the serving cell is equal to 0.25 millisecond, determining, by the base station, the synchronization signal period of the serving cell based on a subframe length of 0.25 millisecond; if the subframe length of the serving cell is equal to 0.5 millisecond, determining, by the base station, the synchronization signal period of the serving cell based on a subframe length of 1 millisecond; or if the subframe length of the serving cell is equal to 1 millisecond, determining, by the base station, the synchronization signal period of the serving cell based on a subframe length of 1 millisecond.

In a possible design, the determining, by the base station, a synchronization signal period of the serving cell based on the subframe length of the serving cell includes: if the subframe length of the serving cell is equal to 0.125 millisecond, determining, by the base station, that the synchronization signal period of the serving cell is a positive integer multiple of 0.25 millisecond; if the subframe length of the serving cell is equal to 0.25 millisecond, determining, by the base station, that the synchronization signal period of the serving cell is a positive integer multiple of 0.25 millisecond; if the subframe length of the serving cell is equal to 0.5 millisecond, determining, by the base station, that the synchronization signal period of the serving cell is a positive integer multiple of 1 millisecond; or if the subframe length of the serving cell is equal to 1 millisecond, determining, by the base station, that the synchronization signal period of the serving cell is a positive integer multiple of 1 millisecond.

In a possible design, the determining, by the base station, a synchronization signal period of the serving cell based on the subframe length of the serving cell includes: if the subframe length of the serving cell is equal to 0.125 millisecond, determining, by the base station, that the synchronization signal period of the serving cell is 1.25 milliseconds; if the subframe length of the serving cell is equal to 0.25 millisecond, determining, by the base station, that the synchronization signal period of the serving cell is 1.25 milliseconds; if the subframe length of the serving cell is equal to 0.5 millisecond, determining, by the base station, that the synchronization signal period of the serving cell is 5 milliseconds; or if the subframe length of the serving cell is equal to 1 millisecond, determining, by the base station, that the synchronization signal period of the serving cell is 5 milliseconds.

In a possible design, the method further includes: sending, by the base station, system information of the serving cell, where a system information period of the serving cell is the same as the synchronization signal period of the serving cell.

In a possible design, the method further includes: determining, by the base station, a system information period of the serving cell based on the subframe length of the serving cell; and the sending or receiving, by the base station, information in the serving cell based on the subframe length of the serving cell further includes: sending or receiving, by the base station, information in the serving cell based on the synchronization signal period, the system information period of the serving cell, and the subframe length.

In a possible design, the determining, by the base station, a system information period of the serving cell based on the subframe length of the serving cell includes: determining, by the base station based on the subframe length of the serving cell, a subframe length set corresponding to the subframe length of the serving cell; and determining, by the base station, the system information period of the serving cell based on a maximum subframe length in the subframe length set.

In a possible design, the sending, by the base station, a synchronization signal in the serving cell based on the synchronization signal period includes: determining, by the base station, a sequence of the synchronization signal based on the subframe length of the serving cell; and sending, by the base station, the synchronization signal in the serving cell based on the synchronization signal period and the sequence of the synchronization signal.

In a possible design, the determining, by the base station, a sequence of the synchronization signal based on the subframe length of the serving cell includes: if the subframe length of the serving cell is a first subframe length, determining, by the base station, that the sequence corresponding to the synchronization signal is a first sequence; or if the subframe length of the serving cell is a second subframe length, determining, by the base station, that the sequence corresponding to the synchronization signal is a second sequence.

In a possible design, the determining, by the base station, a sequence of the synchronization signal based on the subframe length of the serving cell includes: if the subframe length of the serving cell is a third subframe length, determining, by the base station, that the sequence corresponding to the synchronization signal is a third sequence; or if the subframe length of the serving cell is a fourth subframe length, determining, by the base station, that the sequence corresponding to the synchronization signal is a fourth sequence.

In a possible design, the first subframe length is 0.125 millisecond, and the second subframe length is 0.25 millisecond.

In a possible design, the first subframe length is 0.5 millisecond, and the second subframe length is 1 millisecond.

In a possible design, the synchronization signal is a primary synchronization signal.

In a possible design, the synchronization signal is located in the first N symbols of a subframe that carries the synchronization signal, and N is greater than or equal to 1.

According to a third aspect, an information transceiving apparatus is provided, where the information transceiving apparatus includes at least one unit, and the at least one unit of the information transceiving apparatus are separately configured to implement corresponding steps in the information transceiving method provided in any one of the foregoing first aspect or possible designs of the first aspect.

According to a fourth aspect, an information transceiving apparatus is provided, where the information transceiving apparatus includes at least one unit, and the at least one unit of the information transceiving apparatus are separately configured to implement corresponding steps in the information transceiving method provided in any one of the foregoing second aspect or possible designs of the second aspect.

According to a fifth aspect, user equipment is provided. The user equipment includes a processor, and a memory, a transmitter, and a receiver that are connected to the processor, and the processor is configured to implement steps in the information transceiving method provided in any one of the foregoing first aspect or possible designs of the first aspect.

According to a sixth aspect, a base station is provided. The base station includes a processor, and a memory, a transmitter, and a receiver that are connected to the processor, and the processor is configured to implement steps in the information transceiving method provided in any one of the foregoing second aspect or possible designs of the second aspect.

According to a seventh aspect, a computer readable medium is provided, where the computer readable medium stores an instruction for implementing the information transceiving method provided in any one of the foregoing first aspect or possible designs of the first aspect.

According to an eighth aspect, a computer readable medium is provided, where the computer readable medium stores an instruction for implementing the information transceiving method provided in any one of the foregoing second aspect or possible designs of the second aspect.

According to a ninth aspect, an information transceiving system is provided, where the system includes the user equipment provided in the third aspect or the fifth aspect and the base station provided in the fourth aspect or the sixth aspect.

DESCRIPTION OF EMBODIMENTS

To make the objectives, technical solutions, and advantages of the embodiments of the present invention clearer, the following further describes the implementations of the present invention in detail with reference to the accompanying drawings.

Figure 1:
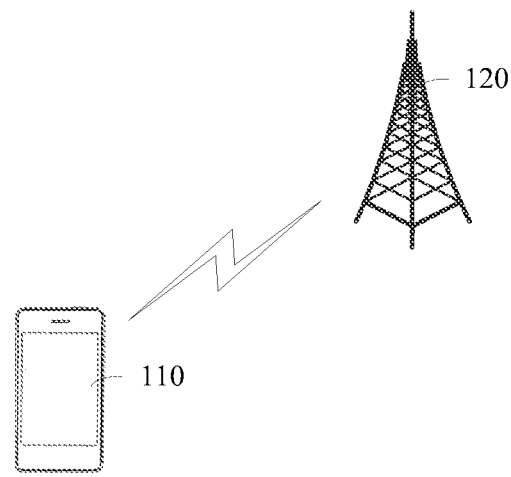
FIG. 1 is a schematic diagram of an implementation environment used in an information transceiving method according to some embodiments of the present invention.

FIG. 1 is a schematic diagram of an implementation environment used in an information transceiving method according to some embodiments of the present invention. The implementation environment includes user equipment 110 and a base station 120.

The user equipment 110 exchanges information with the base station 120 by using a serving cell. The user equipment 110 may be a mobile phone, a tablet computer, a personal computer (PC), a multimedia playback device, or the like. The user equipment 110 and the base station 120 communicate with each other by using a network.

Figure 2:
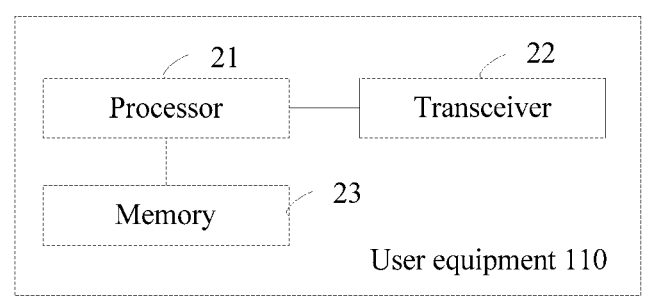
FIG. 2 is a schematic structural diagram of user equipment according to an embodiment of the present invention.

For a structure of the user equipment 110, refer to FIG. 2. The user equipment 110 includes a processor 21, a transceiver 22, and a memory 23.

The processor 21 includes one or more processing cores. The processor 21 runs a software program to perform various function applications and process data.

The transceiver 22 may be configured to communicate with another device, for example, may communicate with the base station 120.

The memory 23 is connected to the processor 21. For example, the memory 23 may be connected to the processor 21 by using a bus. The memory 23 may be configured to store a software program.

The memory 23 may be implemented by any type of volatile or non-volatile storage device or by a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art may understand that the structure of the user equipment 110 shown in FIG. 2 does not constitute a limitation to the user equipment 110. The user equipment may include more or fewer components than those shown in the figure, combine some components, or have different component arrangements.

Figure 3:
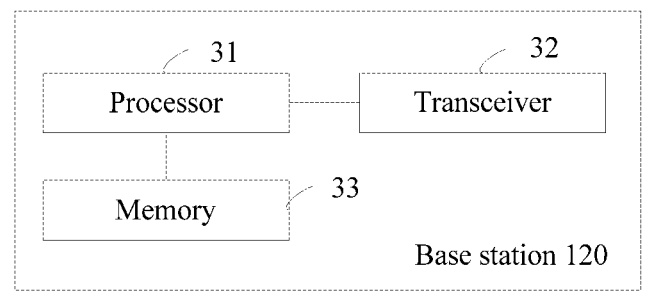
FIG. 3 is a schematic structural diagram of a base station according to an embodiment of the present invention.

For a structure of the base station 120, refer to FIG. 3. The base station 120 includes a processor 31, a transceiver 32, and a memory 33.

The processor 31 includes one or more processing cores. The processor 31 runs a software program to perform various function applications and process data.

The transceiver 32 may be configured to communicate with another device, for example, may communicate with the user equipment 110.

The memory 33 is connected to the processor 31. For example, the memory 33 may be connected to the processor 31 by using a bus. The memory 33 may be configured to store a software program.

The memory 33 may be implemented by any type of volatile or non-volatile storage device or by a combination thereof, for example, a static random access memory, an electrically erasable programmable read-only memory, an erasable programmable read-only memory, a programmable read-only memory, a read-only memory, a magnetic memory, a flash memory, a magnetic disk, or an optic disc.

A person skilled in the art may understand that the structure of the base station 120 shown in FIG. 3 does not constitute a limitation to the base station 120. The base station may include more or fewer components than those shown in the figure, combine some components, or have different component arrangements.

Figure 4A:
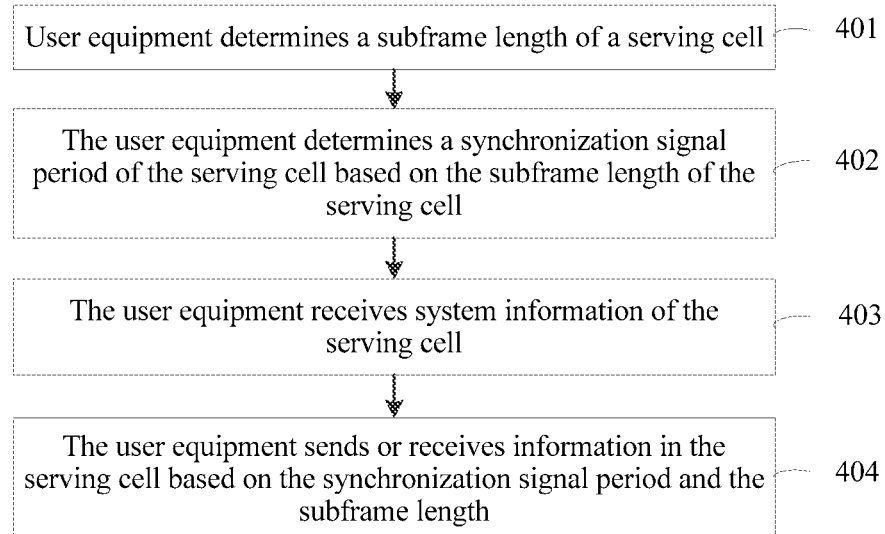
FIG. 4A is a flowchart of an information transceiving method according to an embodiment of the present invention.
Figure 4B:
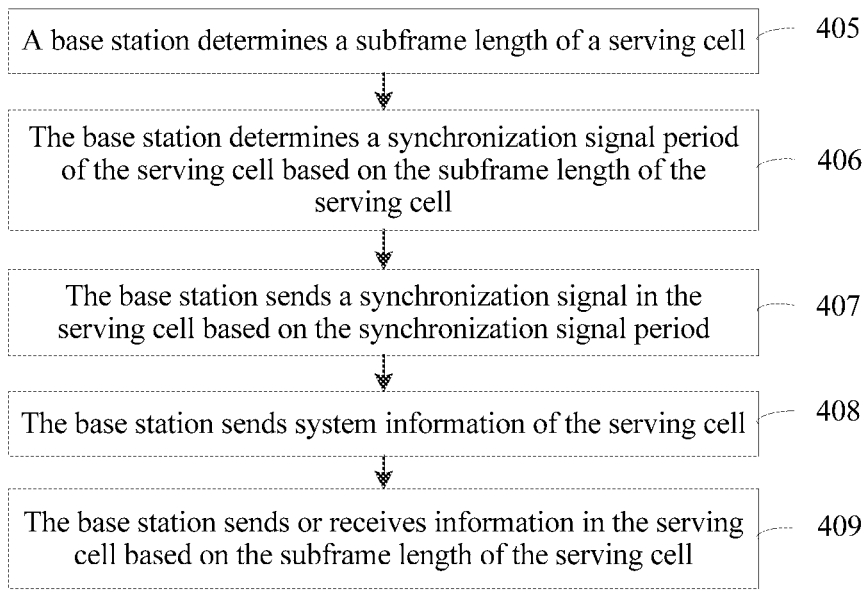
FIG. 4B is a flowchart of an information transceiving method according to another embodiment of the present invention.

With reference to the environment shown in FIG. 1, the following uses examples to separately describe a procedure of an information transceiving method that is shown in FIG. 4A and is executed by user equipment and a procedure of an information transceiving method that is shown in FIG. 4B and is executed by a base station.

Referring to FIG. 4A, FIG. 4A is a flowchart of an information transceiving method according to an embodiment of the present invention. The information transceiving method is applied to the user equipment 110 shown in FIG. 1 and FIG. 2. The information transceiving method includes the following steps.

Step 401. User equipment determines a subframe length of a serving cell.

In this step, that user equipment determines a subframe length of a serving cell also means that the user equipment determines a TTI length of the serving cell or the user equipment determines a TTU length of the serving cell.

The serving cell in all embodiments of the present invention may be a serving cell configured by a network side device for the user equipment, a serving cell serving the user equipment, or a serving cell accessed by the user equipment. The serving cell in all the embodiments of the present invention may also be referred to as a carrier (component carrier). The serving cell in all the embodiments of the present invention may be a primary serving cell of the user equipment, or may be a secondary serving cell of the user equipment.

Figure 4C:
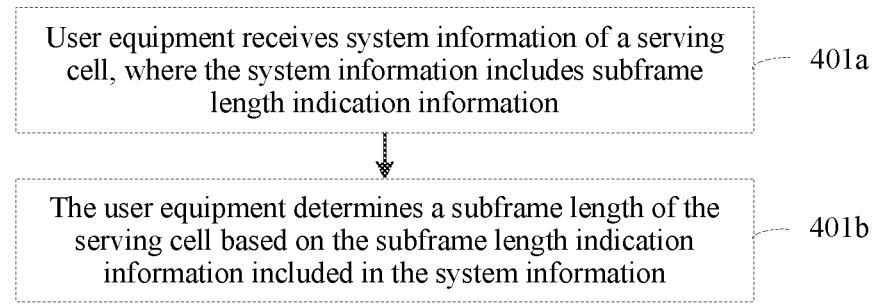
FIG. 4C is a flowchart of determining a subframe length of a serving cell by user equipment according to an embodiment of the present invention.

In this step, referring to FIG. 4C, that user equipment determines a subframe length of a serving cell may include the following steps:

Step 401a. The user equipment receives system information of the serving cell, where the system information includes subframe length indication information.

Step 401b. The user equipment determines the subframe length of the serving cell based on the subframe length indication information included in the system information.

Step 401 may be performed by the processor 21 in FIG. 2.

Step 402. The user equipment determines a synchronization signal period of the serving cell based on the subframe length of the serving cell.

In this step, that the user equipment determines a synchronization signal period of the serving cell based on the subframe length of the serving cell may include at least the following five manners:

In a first manner, the user equipment determines, based on the subframe length of the serving cell, a subframe length set corresponding to the subframe length of the serving cell, and the user equipment determines the synchronization signal period of the serving cell based on a maximum subframe length in the subframe length set.

In a second manner, the user equipment determines, based on the subframe length of the serving cell, a subframe length set corresponding to the subframe length of the serving cell, and the user equipment determines the synchronization signal period of the serving cell based on a minimum subframe length in the subframe length set.

In the first manner or the second manner, optionally, the subframe length set corresponding to the subframe length of the serving cell includes a first subframe length and a second subframe length, the first subframe length is equal to 0.5 millisecond, and the second subframe length is equal to 1 millisecond; or the subframe length set corresponding to the subframe length of the serving cell includes a third subframe length and a fourth subframe length, the third subframe length is equal to 0.125 millisecond, and the fourth subframe length is equal to 0.25 millisecond.

Alternatively, optionally, the subframe length set corresponding to the subframe length of the serving cell is one of a first subframe length set and a second subframe length set, and any subframe length in the first subframe length set is greater than any subframe length in the second subframe length set. Further, optionally, a synchronization signal period that is of the serving cell and is determined based on the first subframe length set is longer than a synchronization signal period that is of the serving cell and is determined based on the second subframe length set.

Further, optionally, the first subframe length set includes a first subframe length and a second subframe length, the first subframe length is equal to 0.5 millisecond, the second subframe length is equal to 1 millisecond, the second subframe length set includes a third subframe length and a fourth subframe length, the third subframe length is equal to 0.125 millisecond, and the fourth subframe length is equal to 0.25 millisecond.

In a third manner, if the subframe length of the serving cell is equal to 0.125 millisecond, the user equipment determines the synchronization signal period of the serving cell based on a subframe length of 0.25 millisecond; if the subframe length of the serving cell is equal to 0.25 millisecond, the user equipment determines the synchronization signal period of the serving cell based on a subframe length of 0.25 millisecond; if the subframe length of the serving cell is equal to 0.5 millisecond, the user equipment determines the synchronization signal period of the serving cell based on a subframe length of 1 millisecond; or if the subframe length of the serving cell is equal to 1 millisecond, the user equipment determines the synchronization signal period of the serving cell based on a subframe length of 1 millisecond.

In a fourth manner, if the subframe length of the serving cell is equal to 0.125 millisecond, the user equipment determines that the synchronization signal period of the serving cell is a positive integer multiple of 0.25 millisecond; if the subframe length of the serving cell is equal to 0.25 millisecond, the user equipment determines that the synchronization signal period of the serving cell is a positive integer multiple of 0.25 millisecond; if the subframe length of the serving cell is equal to 0.5 millisecond, the user equipment determines that the synchronization signal period of the serving cell is a positive integer multiple of 1 millisecond; or if the subframe length of the serving cell is equal to 1 millisecond, the user equipment determines that the synchronization signal period of the serving cell is a positive integer multiple of 1 millisecond.

In a fifth manner, if the subframe length of the serving cell is equal to 0.125 millisecond, the user equipment determines that the synchronization signal period of the serving cell is 1.25 milliseconds; if the subframe length of the serving cell is equal to 0.25 millisecond, the user equipment determines that the synchronization signal period of the serving cell is 1.25 milliseconds; if the subframe length of the serving cell is equal to 0.5 millisecond, the user equipment determines that the synchronization signal period of the serving cell is 5 milliseconds; or if the subframe length of the serving cell is equal to 1 millisecond, the user equipment determines that the synchronization signal period of the serving cell is 5 milliseconds.

Step 402 may be performed by the processor 21 in FIG. 2.

A system information period and the synchronization signal period of the serving cell may be the same. When the system information period and the synchronization signal period of the serving cell are the same, the synchronization signal period that is of the serving cell and is determined by the user equipment based on the subframe length of the serving cell is also the system information period of the serving cell, and the user equipment may further receive system information of the serving cell based on the system information period. For details, refer to step 403. Step 403 is an optional step.

Step 403. The user equipment receives system information of the serving cell.

In this embodiment of the present invention, step 403 is an optional step.

In this step, the user equipment receives the system information of the serving cell, and the system information period of the serving cell may be the same as the synchronization signal period of the serving cell.

In this step, that the user equipment receives system information of the serving cell may include: The user equipment determines the system information period of the serving cell based on the subframe length of the serving cell, and the user equipment receives the system information of the serving cell based on the system information period of the serving cell.

Further, optionally, that the user equipment determines the system information period of the serving cell based on the subframe length of the serving cell may include: The user equipment determines, based on the subframe length of the serving cell, a subframe length set corresponding to the subframe length of the serving cell, and the user equipment determines the system information period of the serving cell based on a maximum subframe length in the subframe length set.

For other descriptions of the subframe length set corresponding to the subframe length of the serving cell, refer to explanations of the subframe length set in step 402. Details are not described herein again.

Alternatively, further, optionally, that the user equipment determines the system information period of the serving cell based on the subframe length of the serving cell may include: The user equipment determines, based on the subframe length of the serving cell, a subframe length set corresponding to the subframe length of the serving cell, and the user equipment determines the system information period of the serving cell based on a minimum subframe length in the subframe length set.

For other descriptions of the subframe length set corresponding to the subframe length of the serving cell, refer to explanations of the subframe length set in step 402. Details are not described herein again.

The step that the user equipment determines the system information period of the serving cell based on the subframe length of the serving cell may be performed by the transceiver 22 in FIG. 2.

Further, optionally, if the subframe length of the serving cell is a minimum subframe length in the first subframe length set, or the subframe length of the serving cell is a minimum subframe length in the second subframe length set, or the subframe length of the serving cell is 0.125 ms or 0.5 ms, the system information includes a subframe number indicator field. The subframe number indicator field is used to indicate an index of a first radio frame block, and the first radio frame block includes eight radio frames. In other words, the subframe number indicator field is used to indicate an index number that is in the first radio frame block and is of a subframe carrying the system information. Further, optionally, scrambling information corresponding to the system information may be used to differentiate an index of a first subframe block corresponding to the subframe carrying the system information. The index of the first subframe block is an index that is in the first radio frame block and is of the first subframe block corresponding to the subframe carrying the system information, and the first subframe block includes two subframes.

Step 403 may be performed by the transceiver 22 in FIG. 2.

Step 404. The user equipment sends or receives information in the serving cell based on the synchronization signal period and the subframe length.

In this step, that the user equipment sends or receives information in the serving cell based on the synchronization signal period and the subframe length may include the following steps:

The user equipment receives a synchronization signal based on the synchronization signal period, to synchronize with the serving cell, and the user equipment sends or receives information in the serving cell based on the subframe length.

In this step, alternatively, that the user equipment sends or receives information in the serving cell based on the synchronization signal period and the subframe length may include the following step:

The user equipment sends or receives information in the serving cell based on the synchronization signal period, the system information period of the serving cell, and the subframe length. This step may be as follows during specific implementation:

The user equipment receives a synchronization signal based on the synchronization signal period, to synchronize with the serving cell; the user equipment receives system information based on the system information period, to determine a system parameter of the serving cell; and the user equipment sends or receives information in the serving cell based on the subframe length.

In this step, that the user equipment sends information in the serving cell may include: The user equipment sends uplink data and uplink control information to a base station in the serving cell based on a resource unit of the serving cell.

In this step, that the user equipment receives information in the serving cell may include: The user equipment receives, in the serving cell based on a resource unit of the serving cell, information sent by a base station. Specifically, the user equipment may receive downlink data, downlink control information, and a downlink reference signal that are sent by the base station.

Step 404 may be performed by the transceiver 22 in FIG. 2.

When the user equipment determines the synchronization signal period of the serving cell in the manner in FIG. 4A, to enable the user equipment to perform information synchronization with the base station, a corresponding process in which the base station determines the synchronization signal period of the serving cell and sends/receives information is shown in FIG. 4B.

Referring to FIG. 4B, FIG. 4B is a flowchart of an information transceiving method according to another embodiment of the present invention. The information transceiving method is applied to the base station 120 shown in FIG. 1 and FIG. 3. The information transceiving method may include the following steps.

Step 405. A base station determines a subframe length of a serving cell.

In this step, that a base station determines a subframe length of a serving cell also means that the base station determines a TTI length of the serving cell or the base station determines a TTU length of the serving cell.

For descriptions of the serving cell herein, refer to descriptions of the serving cell in step 401. Details are not described herein again.

Step 405 may be performed by the processor 31 in FIG. 3.

Step 406. The base station determines a synchronization signal period of the serving cell based on the subframe length of the serving cell.

In this step, that the base station determines a synchronization signal period of the serving cell based on the subframe length of the serving cell may include at least the following five manners:

In a first manner, the base station determines, based on the subframe length of the serving cell, a subframe length set corresponding to the subframe length of the serving cell, and the base station determines the synchronization signal period of the serving cell based on a maximum subframe length in the subframe length set.

In a second manner, the base station determines, based on the subframe length of the serving cell, a subframe length set corresponding to the subframe length of the serving cell, and the base station determines the synchronization signal period of the serving cell based on a minimum subframe length in the subframe length set.

In the first manner or the second manner, further, optionally, the subframe length set corresponding to the subframe length of the serving cell includes a first subframe length and a second subframe length, the first subframe length is equal to 0.5 millisecond, and the second subframe length is equal to 1 millisecond; or the subframe length set corresponding to the subframe length of the serving cell includes a third subframe length and a fourth subframe length, the third subframe length is equal to 0.125 millisecond, and the fourth subframe length is equal to 0.25 millisecond.

Alternatively, further, optionally, the subframe length set corresponding to the subframe length of the serving cell is one of a first subframe length set and a second subframe length set, and any subframe length included in the first subframe length set is greater than any subframe length included in the second subframe length set.

Further, optionally, a synchronization signal period that is of the serving cell and is determined based on the first subframe length set is longer than a synchronization signal period that is of the serving cell and is determined based on the second subframe length set.

Further, optionally, the first subframe length set includes a first subframe length and a second subframe length, the first subframe length is equal to 0.5 millisecond, the second subframe length is equal to 1 millisecond, the second subframe length set includes a third subframe length and a fourth subframe length, the third subframe length is equal to 0.125 millisecond, and the fourth subframe length is equal to 0.25 millisecond.

In a third manner, if the subframe length of the serving cell is equal to 0.125 millisecond, the base station determines the synchronization signal period of the serving cell based on a subframe length of 0.25 millisecond; if the subframe length of the serving cell is equal to 0.25 millisecond, the base station determines the synchronization signal period of the serving cell based on a subframe length of 0.25 millisecond; if the subframe length of the serving cell is equal to 0.5 millisecond, the base station determines the synchronization signal period of the serving cell based on a subframe length of 1 millisecond; or if the subframe length of the serving cell is equal to 1 millisecond, the base station determines the synchronization signal period of the serving cell based on a subframe length of 1 millisecond.

In a fourth manner, if the subframe length of the serving cell is equal to 0.125 millisecond, the base station determines that the synchronization signal period of the serving cell is a positive integer multiple of 0.25 millisecond; if the subframe length of the serving cell is equal to 0.25 millisecond, the base station determines that the synchronization signal period of the serving cell is a positive integer multiple of 0.25 millisecond; if the subframe length of the serving cell is equal to 0.5 millisecond, the base station determines that the synchronization signal period of the serving cell is a positive integer multiple of 1 millisecond; or if the subframe length of the serving cell is equal to 1 millisecond, the base station determines that the synchronization signal period of the serving cell is a positive integer multiple of 1 millisecond.

In a fifth manner, if the subframe length of the serving cell is equal to 0.125 millisecond, the base station determines that the synchronization signal period of the serving cell is 1.25 milliseconds; if the subframe length of the serving cell is equal to 0.25 millisecond, the base station determines that the synchronization signal period of the serving cell is 1.25 milliseconds; if the subframe length of the serving cell is equal to 0.5 millisecond, the base station determines that the synchronization signal period of the serving cell is 5 milliseconds; or if the subframe length of the serving cell is equal to 1 millisecond, the base station determines that the synchronization signal period of the serving cell is 5 milliseconds.

Step 406 may be performed by the processor 31 in FIG. 3.

Step 407. The base station sends a synchronization signal in the serving cell based on the synchronization signal period.

In this embodiment of the present invention, in step 407, the base station sends the synchronization signal in the serving cell based on the synchronization signal period. For example, the base station determines, based on the synchronization signal period, a subframe for sending the synchronization signal, and sends the synchronization signal in the subframe for sending the synchronization signal.

Step 407 may be performed by the transceiver 32 in FIG. 3.

A system information period and the synchronization signal period of the serving cell may be the same. When the system information period and the synchronization signal period of the serving cell are the same, the base station may determine the synchronization signal period of the serving cell based on the subframe length of the serving cell, namely, the system information period of the serving cell, and may send system information of the serving cell based on the period. For details, refer to step 408. Step 408 is an optional step.

Step 408. The base station sends system information of the serving cell.

In this embodiment of the present invention, step 408 is an optional step.

In this step, the base station sends the system information of the serving cell, and the system information period of the serving cell may be the same as the synchronization signal period of the serving cell.

In this step, that the base station sends system information of the serving cell may include: The base station determines the system information period of the serving cell based on the subframe length of the serving cell, and the base station receives the system information of the serving cell based on the system information period of the serving cell.

Further, optionally, that the base station determines the system information period of the serving cell based on the subframe length of the serving cell may include: The base station determines, based on the subframe length of the serving cell, a subframe length set corresponding to the subframe length of the serving cell, and the base station determines the system information period of the serving cell based on a maximum subframe length in the subframe length set.

For other descriptions of the subframe length set corresponding to the subframe length of the serving cell, refer to explanations of the subframe length set in step 402. Details are not described herein again.

Alternatively, further optionally, that the base station determines the system information period of the serving cell based on the subframe length of the serving cell may include the following steps:

The base station determines, based on the subframe length of the serving cell, a subframe length set corresponding to the subframe length of the serving cell; and the base station determines the system information period of the serving cell based on a minimum subframe length in the subframe length set.

For other descriptions of the subframe length set corresponding to the subframe length of the serving cell, refer to explanations of the subframe length set in step 402. Details are not described herein again.

Further, optionally, in this step, that the base station sends system information of the serving cell may include the following step:

The base station sends the system information of the serving cell, where the system information includes subframe length indication information, and the subframe length indication information is used to indicate the subframe length of the serving cell.

Further, optionally, if the subframe length of the serving cell is a shortest subframe length in the first subframe length set, or the subframe length of the serving cell is a shortest subframe length in the second subframe length set, or the subframe length of the serving cell is 0.125 ms or 0.5 ms, the system information includes a subframe number indicator field. The subframe number indicator field is used to indicate an index of a first radio frame block, and the first radio frame block includes eight radio frames. In other words, the subframe number indicator field is used to indicate an index number that is in the first radio frame block and is of a subframe that carries the system information. Further, optionally, scrambling information corresponding to the system information may be used to differentiate an index of a first subframe block corresponding to the subframe that carries the system information. The index of the first subframe block is an index that is in the first radio frame block and is of the first subframe block corresponding to the subframe that carries the system information, and the first subframe block includes two subframes.

Step 408 may be performed by the transceiver 32 in FIG. 3.

Step 409. The base station sends or receives information in the serving cell based on the subframe length of the serving cell.

In this step, that the base station sends information in the serving cell based on the subframe length may include: The base station sends downlink data, downlink control information, and a downlink reference signal to user equipment.

In this step, that the base station receives information in the serving cell based on the subframe length may include: The base station receives, in the serving cell based on a resource unit of the serving cell, information sent by user equipment. Specifically, the base station may receive uplink data and uplink control information that are sent by the user equipment.

The system information in all the embodiments of the present invention may be a master information block (MIB).

It should be noted that in the embodiments of the present invention, unless otherwise specified, a sequence between the steps and interdependence between the steps are not limited.

Step 409 may be performed by the transceiver 32 in FIG. 3.

In conclusion, in the information transceiving method provided in an embodiment of the present invention, the user equipment determines, based on the subframe length of the serving cell, the synchronization signal period of the serving cell, so that a problem about how to design synchronization signals corresponding to different subframe lengths associated with a same subcarrier spacing in 5G is resolved.

Further, the user equipment determines, based on the subframe length of the serving cell, the subframe length set corresponding to the subframe length of the serving cell, and the user equipment determines the synchronization signal period of the serving cell based on the maximum subframe length in the subframe length set, or the user equipment determines the synchronization signal period of the serving cell based on the minimum subframe length in the subframe length set. Therefore, different subframe lengths belonging to a same subframe length set are corresponding to only one synchronization signal design, and design complexity is reduced. When the synchronization signal period is determined based on the maximum subframe length in the subframe length set, synchronization signal overheads may be reduced and resource utilization may be improved while a proper latency is ensured. When the synchronization signal period is determined based on the minimum subframe length in the subframe length set, a cell access time of the user equipment and a service latency may be reduced while proper overheads are ensured.

Further, the subframe length set corresponding to the subframe length of the serving cell is one of the first subframe length set and the second subframe length set, the first subframe length set includes the first subframe length and the second subframe length, the first subframe length is equal to 0.5 millisecond, the second subframe length is equal to 1 millisecond, the second subframe length set includes the third subframe length and the fourth subframe length, the third subframe length is equal to 0.125 millisecond, and the fourth subframe length is equal to 0.25 millisecond. Therefore, different subframe lengths corresponding to a same subcarrier spacing are grouped into two subframe length sets, two shortest subframe lengths belong to a same subframe length set, and two longest subframes belong to a same subframe length set. Therefore, when a same synchronization signal design is used for a same subframe length set, proper resources can be used to ensure a proper latency requirement.

In this embodiment of the present invention, beneficial effects of a design of the system information period are similar to those of a design of the synchronization signal period, and details are not described herein.

Figure 4D:
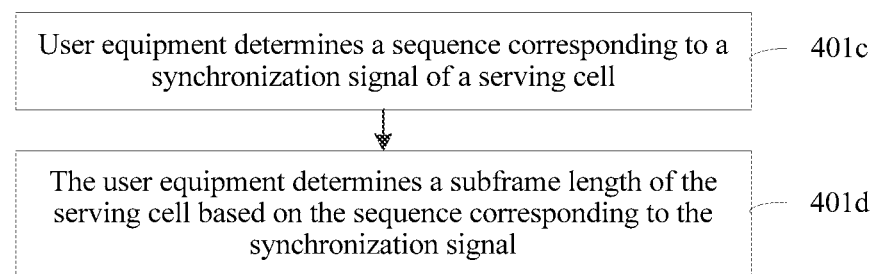
FIG. 4D is a flowchart of determining a subframe length of a serving cell by user equipment according to an embodiment of the present invention.

During actual implementation, step 401 may be implemented by using the steps in FIG. 4C. In addition, the subframe length of the serving cell may further be determined by using a sequence corresponding to a synchronization signal in step 401. Referring to FIG. 4D, that user equipment determines a subframe length of a serving cell may include the following steps:

Step 401c. The user equipment determines a sequence corresponding to a synchronization signal of the serving cell.

Step 401d. The user equipment determines the subframe length of the serving cell based on the sequence corresponding to the synchronization signal.

Further, step 401d that the user equipment determines the subframe length of the serving cell based on the sequence corresponding to the synchronization signal may be as follows:

If the sequence corresponding to the synchronization signal is a first sequence, the user equipment determines that the subframe length of the serving cell is a first subframe length; or if the sequence corresponding to the synchronization signal is a second sequence, the user equipment determines that the subframe length of the serving cell is a second subframe length.

Alternatively, further, step 401d that the user equipment determines the subframe length of the serving cell based on the sequence corresponding to the synchronization signal may be as follows:

If the sequence corresponding to the synchronization signal is a third sequence, the user equipment determines that the subframe length of the serving cell is a third subframe length; or if the sequence corresponding to the synchronization signal is a fourth sequence, the user equipment determines that the subframe length of the serving cell is a fourth subframe length.

Further, the first subframe length may be 0.125 millisecond, the second subframe length may be 0.25 millisecond, the third subframe length may be 0.5 millisecond, and the fourth subframe length may be 1 millisecond.

Further, optionally, the first sequence is the same as the third sequence, and the second sequence is the same as the fourth sequence. In this case, the user equipment may further distinguish between the first subframe length and the third subframe length based on a carrier frequency of the serving cell or a subcarrier spacing of the serving cell, and may further distinguish between the second subframe length and the fourth subframe length based on the carrier frequency of the serving cell or the subcarrier spacing of the serving cell. Further, optionally, a first carrier frequency is corresponding to the first subframe length and the second subframe length, and a second carrier frequency is corresponding to the third subframe length and the fourth subframe length. The user equipment determines, based on the carrier frequency of the serving cell, a subframe length set corresponding to the serving cell, and further determines the subframe length of the serving cell based on the sequence corresponding to the synchronization signal.

Further, the synchronization signal may be a primary synchronization signal.

Further, optionally, the synchronization signal is located in the first N symbols of a subframe that carries the synchronization signal, and N is greater than or equal to 1. Further, optionally, the synchronization signal includes a primary synchronization signal and a secondary synchronization signal. The synchronization signal is located in the first N symbols of a subframe that carries the synchronization signal, and N is greater than or equal to 2. Further, optionally, the subframe that carries the synchronization signal further carries system information. The system information is carried on M symbols following the N symbols, and M is a positive integer greater than or equal to 1.

Further, optionally, that the user equipment determines a sequence corresponding to a synchronization signal of the serving cell may include the following steps:

The user equipment determines a candidate sequence corresponding to the synchronization signal, and the user equipment detects the synchronization signal based on the candidate sequence, and determines the sequence corresponding to the synchronization signal.

Specifically, the user equipment may perform blind detection on the synchronization signal based on the candidate sequence, to determine the sequence corresponding to the synchronization signal.

Corresponding to the steps in FIG. 4D, in step 408, the system information that is of the serving cell and is sent by the base station includes no subframe length indication.

Figure 4E:
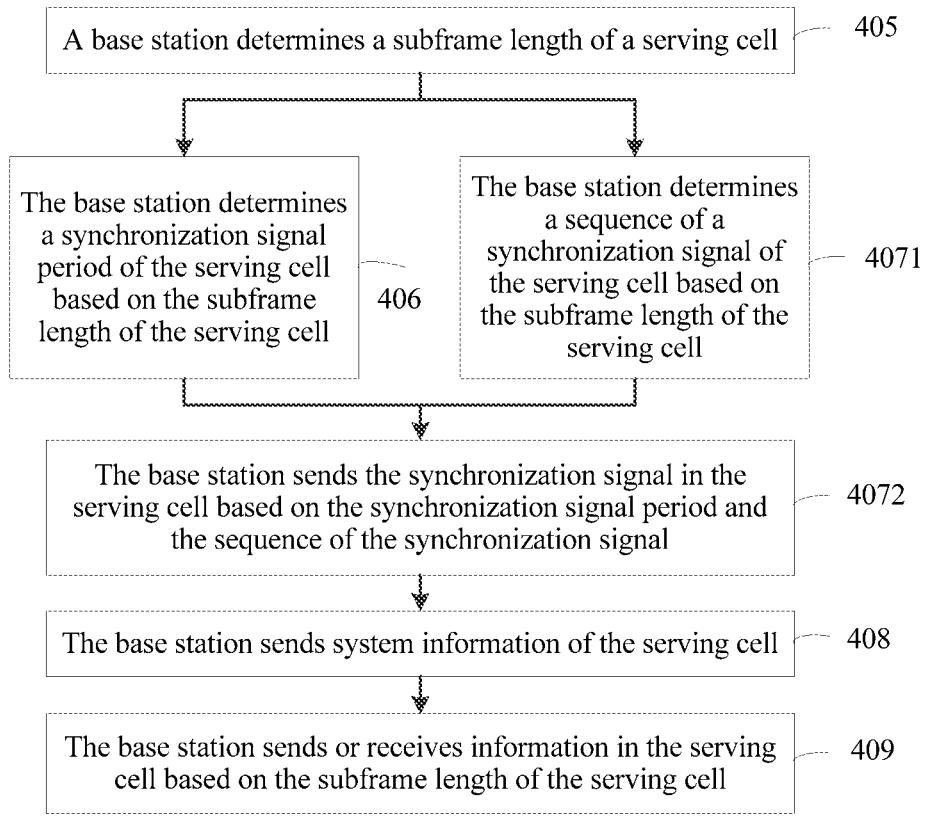
FIG. 4E is a flowchart of an information transceiving method according to still another embodiment of the present invention.

Further, the base station may determine a sequence of a synchronization signal of the serving cell based on the subframe length of the serving cell, and then send the synchronization signal in the serving cell based on the synchronization signal period of the serving cell and the sequence of the synchronization signal of the serving cell. Therefore, step 407 may be implemented by using the steps in FIG. 4B. In addition, referring to FIG. 4E, step 407 may further be replaced with step 4071 and step 4072.

Step 4071. The base station determines a sequence of the synchronization signal of the serving cell based on the subframe length of the serving cell.

This step may be performed by the processor 31 in FIG. 3.

Step 4072. The base station sends the synchronization signal in the serving cell based on the synchronization signal period and the sequence of the synchronization signal.

Further, that the base station determines a sequence of the synchronization signal of the serving cell based on the subframe length of the serving cell may be as follows:

If the sequence corresponding to the synchronization signal is a first sequence, the base station determines that the subframe length of the serving cell is a first subframe length; or if the sequence corresponding to the synchronization signal is a second sequence, the base station determines that the subframe length of the serving cell is a second subframe length.

Alternatively, further, that the base station determines the subframe length of the serving cell based on the sequence corresponding to the synchronization signal may be as follows:

If the sequence corresponding to the synchronization signal is a third sequence, the base station determines that the subframe length of the serving cell is a third subframe length; or if the sequence corresponding to the synchronization signal is a fourth sequence, the base station determines that the subframe length of the serving cell is a fourth subframe length.

Further, the first subframe length may be 0.125 millisecond, the second subframe length may be 0.25 millisecond, the third subframe length may be 0.5 millisecond, and the fourth subframe length may be 1 millisecond.

Further, optionally, the first sequence is the same as the third sequence, and the second sequence is the same as the fourth sequence.

Further, the synchronization signal may be a primary synchronization signal.

Further, optionally, the synchronization signal is located in the first N symbols of a subframe that carries the synchronization signal, and N is greater than or equal to 1. Further, optionally, the synchronization signal includes a primary synchronization signal and a secondary synchronization signal. The synchronization signal is located in the first N symbols of a subframe that carries the synchronization signal, and N is greater than or equal to 2. Further, optionally, the subframe that carries the synchronization signal further carries system information. The system information is carried on M symbols following the N synchronization signals, and M is a positive integer greater than or equal to 1.

It should be noted that in the embodiments of the present invention, unless otherwise specified, a sequence between the steps and interdependence between the steps are not limited.

In conclusion, in the information transceiving method provided in an embodiment of the present invention, the user equipment determines, based on the subframe length of the serving cell, the synchronization signal period of the serving cell, so that a problem about how to design synchronization signals corresponding to different subframe lengths with a same subcarrier spacing in 5G is resolved.

Further, the user equipment determines, based on the subframe length of the serving cell, the subframe length set corresponding to the subframe length of the serving cell, and the user equipment determines the synchronization signal period of the serving cell based on the maximum subframe length in the subframe length set, or the user equipment determines the synchronization signal period of the serving cell based on the minimum subframe length in the subframe length set. Therefore, different subframe lengths belonging to a same subframe length set are corresponding to only one synchronization signal design, and design complexity is reduced. When the synchronization signal period is determined based on the maximum subframe length in the subframe length set, synchronization signal overheads may be reduced and resource utilization may be improved while a proper latency is ensured. When the synchronization signal period is determined based on the minimum subframe length in the subframe length set, a cell access time of the user equipment and a service latency may be reduced while proper overheads are ensured.

Further, the subframe length set corresponding to the subframe length of the serving cell is one of the first subframe length set and the second subframe length set, the first subframe length set includes the first subframe length and the second subframe length, the first subframe length is equal to 0.5 millisecond, the second subframe length is equal to 1 millisecond, the second subframe length set includes the third subframe length and the fourth subframe length, the third subframe length is equal to 0.125 millisecond, and the fourth subframe length is equal to 0.25 millisecond. Therefore, different subframe lengths corresponding to a same subcarrier spacing are grouped into two subframe length sets, two shortest subframe lengths belong to a same subframe length set, and two longest subframes belong to a same subframe length set. Therefore, when a same synchronization signal design is used for a same subframe length set, proper resources can be used to ensure a proper latency requirement.

In this embodiment of the present invention, beneficial effects of a design of the system information period are similar to those of a design of the synchronization signal period, and details are not described herein.

Figure 5:
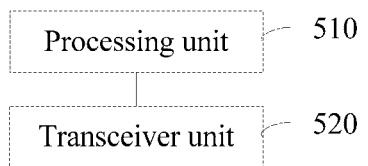
FIG. 5 is a block diagram of an information transceiving apparatus according to an embodiment of the present invention.

Referring to FIG. 5, FIG. 5 is a block diagram of an information transceiving apparatus according to an embodiment of the present invention. The information transceiving apparatus may be implemented as all or a part of user equipment by using software, hardware, or a combination of software and hardware. The information transceiving apparatus may include a processing unit 510 and a transceiver unit 520.

The processing unit 510 is configured to implement a function of at least one of step 401 or step 402.

The transceiver unit 520 is configured to implement a function of at least one of step 403 or step 404.

Optionally, the transceiver unit 520 is further configured to implement a function of step 401a, and the processing unit 510 is further configured to implement a function of step 401b.

Optionally, the processing unit 510 is further configured to implement a function of at least one of step 401c or step 401d.

For related details, refer to the foregoing method embodiments.

Optionally, in this embodiment of the present invention, the processing unit 510 may be implemented by the processor 21 shown in FIG. 2, and the transceiver unit 520 may be implemented by the transceiver 22 shown in FIG. 2.

Figure 6:
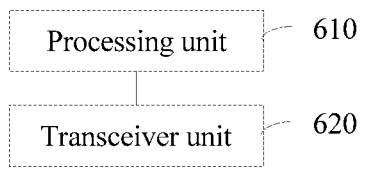
FIG. 6 is a block diagram of an information transceiving apparatus according to another embodiment of the present invention.

Referring to FIG. 6, FIG. 6 is a block diagram of an information transceiving apparatus according to another embodiment of the present invention. The information transceiving apparatus may be implemented as all or a part of a base station by using software, hardware, or a combination of software and hardware. The information transceiving apparatus may include a processing unit 610 and a transceiver unit 620.

The processing unit 610 is configured to implement a function of at least one of step 405 or step 406.

The transceiver unit 620 is configured to implement a function of at least one of step 407, step 408, or step 409.

Optionally, the transceiver unit 620 is further configured to implement a function of step 4072, and the processing unit 610 is further configured to implement a function of step 4071.

For related details, refer to the foregoing method embodiments.

Optionally, in this embodiment of the present invention, the processing unit 610 may be implemented by the processor 31 shown in FIG. 3, and the transceiver unit 620 may be implemented by the transceiver 32 shown in FIG. 3.

It should be noted that, when the information transceiving apparatus provided in the foregoing embodiments receives or sends information, division of the foregoing function units is only used as an example for description. During actual application, the foregoing functions may be allocated to different function units for implementation as required. To be specific, an internal structure of the base station or the user equipment is divided into different function units to implement all or some of the functions described above. In addition, the information transceiving apparatus provided in the foregoing embodiments pertains to a same concept as the information transceiving method. For a specific implementation process, refer to the method embodiments. Details are not described herein again.

An embodiment of the present invention further provides an information transceiving system. The information transceiving system includes user equipment and a base station. The user equipment includes the information transceiving apparatus shown in FIG. 5, and the base station includes the information transceiving apparatus shown in FIG. 6. For details, refer to descriptions in FIG. 5 and FIG. 6. Details are not described herein again.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing apparatus and unit, refer to a corresponding process in the foregoing method embodiments. Details are not described herein again.

In the several embodiments provided in this application, it should be understood that the disclosed apparatus and method may be implemented in other manners. For example, the described apparatus embodiment is only an example. For example, the unit division may be only logical function division and may be other division during actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present invention may be integrated into one processing unit, or each of the units may exist alone physically, or two or more units are integrated into one unit.

When the functions are implemented in a form of a software function unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps in the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

A person of ordinary skill in the art may understand that all or some of the steps in the foregoing embodiments may be implemented by hardware or a program instructing related hardware. The program may be stored in a computer readable storage medium. The storage medium may be a read-only memory, a magnetic disk, an optical disc, or the like.

What is claimed is:

1. An information transceiving method, wherein the method comprises:
   determining, by user equipment, a subframe length of a serving cell;
   determining, by the user equipment, a synchronization signal period of the serving cell based on the subframe length of the serving cell, wherein the determining of the synchronization signal period of the service cell comprises:
   determining, by the user equipment based on the subframe length of the serving cell, a subframe length set corresponding to the subframe length of the serving cell;
   determining, by the user equipment, the synchronization signal period of the serving cell based on a maximum subframe length in the subframe length set; and
sending or receiving, by the user equipment, information in the serving cell based on the synchronization signal period and the subframe length.

2. The method according to claim 1, wherein the subframe length set corresponding to the subframe length of the serving cell is one of a first subframe length set and a second subframe length set, and any subframe length in the first subframe length set is greater than any subframe length in the second subframe length set.

3. The method according to claim 2, wherein a synchronization signal period that is of the serving cell and is determined based on the first subframe length set is longer than a synchronization signal period that is of the serving cell and is determined based on the second subframe length set.

4. The method according to claim 2, wherein the first subframe length set comprises a first subframe length and a second subframe length, the first subframe length is equal to 0.5 millisecond, the second subframe length is equal to 1 millisecond, the second subframe length set comprises a third subframe length and a fourth subframe length, the third subframe length is equal to 0.125 millisecond, and the fourth subframe length is equal to 0.25 millisecond.

5. The method according to claim 1, wherein:
   the subframe length set corresponding to the subframe length of the serving cell comprises a first subframe length and a second subframe length, the first subframe length is equal to 0.5 millisecond, and the second subframe length is equal to 1 millisecond; or
   the subframe length set corresponding to the subframe length of the serving cell comprises a third subframe length and a fourth subframe length, the third subframe length is equal to 0.125 millisecond, and the fourth subframe length is equal to 0.25 millisecond.

6. The method according to claim 1, wherein the determining, by the user equipment, a synchronization signal period of the serving cell based on the subframe length of the serving cell comprises:
   if the subframe length of the serving cell is equal to 0.125 millisecond, determining, by the user equipment, the synchronization signal period of the serving cell based on a subframe length of 0.25 millisecond;
   if the subframe length of the serving cell is equal to 0.25 millisecond, determining, by the user equipment, the synchronization signal period of the serving cell based on a subframe length of 0.25 millisecond;
   if the subframe length of the serving cell is equal to 0.5 millisecond, determining, by the user equipment, the synchronization signal period of the serving cell based on a subframe length of 1 millisecond; or
   if the subframe length of the serving cell is equal to 1 millisecond, determining, by the user equipment, the synchronization signal period of the serving cell based on a subframe length of 1 millisecond.

7. An information transceiving apparatus, wherein the apparatus comprises:
   at least one processor;
   a non-transitory computer-readable storage medium coupled to the at least one processor and storing programming instructions for execution by the at least one processor, wherein the programming instructions instruct the at least one processor to:
      determine a subframe length of a serving cell; and
      determine a synchronization signal period of the serving cell based on the determined subframe length of the serving cell, wherein the determining of the synchronization signal period of the service cell comprises:
         determine, based on the subframe length of the serving cell, a subframe length set corresponding to the subframe length of the serving cell; and
         determine the synchronization signal period of the serving cell based on a maximum subframe length in the subframe length set; and
   a transceiver configured to send or receive information in the serving cell based on the synchronization signal period determined by the processor and the subframe length determined by the processor.

8. The apparatus according to claim 7, wherein the subframe length set corresponding to the subframe length of the serving cell is one of a first subframe length set and a second subframe length set, and any subframe length in the first subframe length set is greater than any subframe length in the second subframe length set.

9. The apparatus according to claim 8, wherein a synchronization signal period that is of the serving cell and is determined based on the first subframe length set is longer than a synchronization signal period that is of the serving cell and is determined based on the second subframe length set.

10. The apparatus according to claim 8, wherein the first subframe length set comprises a first subframe length and a second subframe length, the first subframe length is equal to 0.5 millisecond, the second subframe length is equal to 1 millisecond, the second subframe length set comprises a third subframe length and a fourth subframe length, the third subframe length is equal to 0.125 millisecond, and the fourth subframe length is equal to 0.25 millisecond.

11. The apparatus according to claim 7, wherein:
   the subframe length set corresponding to the subframe length of the serving cell comprises a first subframe length and a second subframe length, the first subframe length is equal to 0.5 millisecond, and the second subframe length is equal to 1 millisecond; or
   the subframe length set corresponding to the subframe length of the serving cell comprises a third subframe length and a fourth subframe length, the third subframe length is equal to 0.125 millisecond, and the fourth subframe length is equal to 0.25 millisecond.

12. The apparatus according to claim 7, wherein the programming instructions instruct the at least one processor to:
   if the subframe length of the serving cell is equal to 0.125 millisecond, determine the synchronization signal period of the serving cell based on a subframe length of 0.25 millisecond;
   if the subframe length of the serving cell is equal to 0.25 millisecond, determine the synchronization signal period of the serving cell based on a subframe length of 0.25 millisecond;

if the subframe length of the serving cell is equal to 0.5 millisecond, determine the synchronization signal period of the serving cell based on a subframe length of 1 millisecond; or if the subframe length of the serving cell is equal to 1 millisecond, determine the synchronization signal period of the serving cell based on a subframe length of 1 millisecond.

13. An information transceiving apparatus, wherein the apparatus comprises:

at least one processor;

a non-transitory computer-readable storage medium coupled to the at least one processor and storing programming instructions for execution by the at least one processor, wherein the programming instructions instruct the at least one processor to:

determine a subframe length of a serving cell; and determine a synchronization signal period of the serving cell based on the determined subframe length of the serving cell, wherein the determining of the synchronization signal period of the service cell comprises:

determine, based on the subframe length of the serving cell, a subframe length set corresponding to the subframe length of the serving cell; and determine the synchronization signal period of the serving cell based on a maximum subframe length in the subframe length set; and a transceiver configured to:

send a synchronization signal in the serving cell based on the synchronization signal period determined by the at least one processor; and send or receive information in the serving cell based on the subframe length of the serving cell.

14. The apparatus according to claim 13, wherein the subframe length set corresponding to the subframe length of the serving cell is one of a first subframe length set and a second subframe length set, and any subframe length in the first subframe length set is greater than any subframe length in the second subframe length set.

15. The apparatus according to claim 14, wherein a synchronization signal period that is of the serving cell and is determined based on the first subframe length set is longer than a synchronization signal period that is of the serving cell and is determined based on the second subframe length set.

16. The apparatus according to claim 14, wherein the first subframe length set comprises a first subframe length and a second subframe length, the first subframe length is equal to 0.5 millisecond, the second subframe length is equal to 1 millisecond, the second subframe length set comprises a third subframe length and a fourth subframe length, the third subframe length is equal to 0.125 millisecond, and the fourth subframe length is equal to 0.25 millisecond.

17. The apparatus according to claim 13, wherein:

the subframe length set corresponding to the subframe length of the serving cell comprises a first subframe length and a second subframe length, the first subframe length is equal to 0.5 millisecond, and the second subframe length is equal to 1 millisecond; or the subframe length set corresponding to the subframe length of the serving cell comprises a third subframe length and a fourth subframe length, the third subframe length is equal to 0.125 millisecond, and the fourth subframe length is equal to 0.25 millisecond.

* * * * *